US012792381B2

(12) United States Patent
Tu et al.

(10) Patent No.: US 12,792,381 B2
(45) Date of Patent: Nov. 10, 2026

(54) UNIFIED SCANNER REDIRECTION METHOD ACROSS DIFFERENT TRANSFER MODES

(71) Applicant: Omnissa, LLC, Mountain View, CA (US)

(72) Inventors: Zhongzheng Tu, Beijing (CN); Huiyong Huo, Beijing (CN); Mingsheng Zang, Beijing (CN); Kai Xiang, Beijing (CN); Ning Ge, Beijing (CN); Tao Jin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 537 days.

(21) Appl. No.: 18/465,047

(22) Filed: Sep. 11, 2023

(65) Prior Publication Data

US 2025/0036446 A1 Jan. 30, 2025

(30) Foreign Application Priority Data

Jul. 24, 2023 (WO) ................ PCT/CN2023/108822

(51) Int. Cl.
*G06F 9/455* (2018.01)
*H04N 1/00* (2006.01)

(52) U.S. Cl.
CPC .................... *G06F 9/45558* (2013.01); *G06F 2009/45583* (2013.01); *H04N 1/00* (2013.01); *H04N 1/00973* (2013.01)

(58) Field of Classification Search
None
See application file for complete search history.

(56) References Cited

U.S. PATENT DOCUMENTS

| | | | | |
|---|---|---|---|---|
| 10,230,855 | B1 | 3/2019 | Sarreo | |
| 2008/0201485 | A1 | 8/2008 | Patwardhan | |
| 2018/0253447 | A1 * | 9/2018 | Li ...................... | H04N 1/00127 |
| 2024/0205357 | A1 | 6/2024 | Huo | |
| 2025/0008030 | A1 | 1/2025 | Tu | |
| 2025/0036446 | A1 | 1/2025 | Tu | |
| 2025/0080663 | A1 | 3/2025 | Huo | |

OTHER PUBLICATIONS

"Setting the TWAIN Image Acquisition Mode", 2012, Accusoft Corporation, ImageGear Professional DLL v17.2 for Windows. (Year: 2012).*

"Document Scanner—TWAIN, WIA, ISIS or SANE," Jan. 7, 2020, Dynamsoft, 5 pages, https://www.dynamsoft.com/blog/insights/document-scanning-twain-wia-isis-sane.

* cited by examiner

*Primary Examiner* — Qing Yuan Wu
(74) *Attorney, Agent, or Firm* — Kim & Stewart LLP

(57) ABSTRACT

A scanner redirection method for a remote desktop computer system that includes a client computer and a remote virtual machine (VM), includes the steps of: setting a virtual data source of the remote VM to use one of a plurality of transfer modes selected by a user of an application executing on the remote VM, wherein each of the transfer modes specifies how images are to be provided to the application; transmitting a request to the client computer to acquire an image, wherein the client computer acquires the image from an image capturing device connected to the client computer and then transmits the image to the remote VM; and upon receiving the image from the client computer, providing, by the virtual data source to the application, the image according to the selected transfer mode setting of the virtual data source.

20 Claims, 12 Drawing Sheets

UNIFIED SCANNER REDIRECTION METHOD ACROSS DIFFERENT TRANSFER MODES

CROSS-REFERENCE

This application is based upon and claims the benefit of priority from International Patent Application No. PCT/CN2023/108822, filed on Jul. 24, 2023, the entire contents of which are incorporated herein by reference.

BACKGROUND

Users of applications such as Adobe Photoshop® sometimes use those applications to acquire and render images obtained from image capturing devices (ICDs) such as scanners or digital cameras. A popular protocol for communicating with such ICDs is the TWAIN protocol, whereby a software component called a "data source" acquires the images from the ICDs to provide to the applications. The TWAIN protocol supports three different modes for how images are provided to the applications. The transfer modes include a "native" transfer mode, a "disk file" transfer mode, and a "buffered memory" transfer mode.

According to the native transfer mode, the data source provides the contents of an image to the application as a direct return value of a call made by the application to the data source. According to the disk file transfer mode, the data source stores a file that includes the image, and the application loads the file from storage. According to the buffered memory transfer mode, the data source splits the image into a plurality of portions and stores each of the portions in memory. The application then loads the portions from memory and combines them to acquire the complete image.

Many organizations rely on remote desktop (RD) services to provide lean, flexible computing environments. RD scanning is one important feature required by the end user of an RD service. Through RD scanning, an application executing on a remote (agent) computer such as a server acquires images from client-side ICDs. Specifically, through scanner redirection, the remote computer transmits a request to a client computer such as a laptop for one or more images, the client computer being connected to an ICD. The client computer then acquires the image(s) from the ICD and transmits them to the remote computer. With remote scanning, the application acquiring the image(s) executes on a different computing device than that of the data source communicating with the ICD. To fully support the TWAIN protocol, which is widely used today, a method is needed that allows an application on a remote computer to use any of the above transfer modes for acquiring images.

SUMMARY

Accordingly, one or more embodiments provide for an RD computer system, wherein the RD computer system includes a client computer and a remote virtual machine (VM). The remote VM includes RD software that is configured to communicate with the client computer, and the client computer includes RD software that is configured to communicate with an ICD. Specifically, the RD software of the remote VM includes a "virtual data source" for communicating with the client computer. According to some embodiments, the RD software of the client computer includes its own data source that communicates with the ICD. According to other embodiments, the RD software of the client computer includes an "image capture core," which is a service running in an operating system (OS) that exposes application programming interfaces (APIs) for communicating with the ICD. The APIs are used for, e.g., adjusting settings of the ICD and acquiring images therefrom.

One or more embodiments provide a scanner redirection method for an RD computer system. The RD computer system includes a client computer and a remote VM, and the client computer and the remote VM are each configured to execute RD software. The method includes the steps of: setting a virtual data source of the remote VM to use one of a plurality of transfer modes selected by a user of an application executing on the remote VM, wherein each of the transfer modes specifies how images are to be provided to the application; transmitting a request to the client computer to acquire an image, wherein the client computer acquires the image from an ICD connected to the client computer and then transmits the image to the remote VM; and upon receiving the image from the client computer, providing, by the virtual data source to the application, the image according to the selected transfer mode setting of the virtual data source.

Further embodiments include a non-transitory computer-readable storage medium comprising instructions that cause an RD computer system to carry out the above method, as well as an RD computer system configured to carry out the above method.

DETAILED DESCRIPTION

Figure 1:
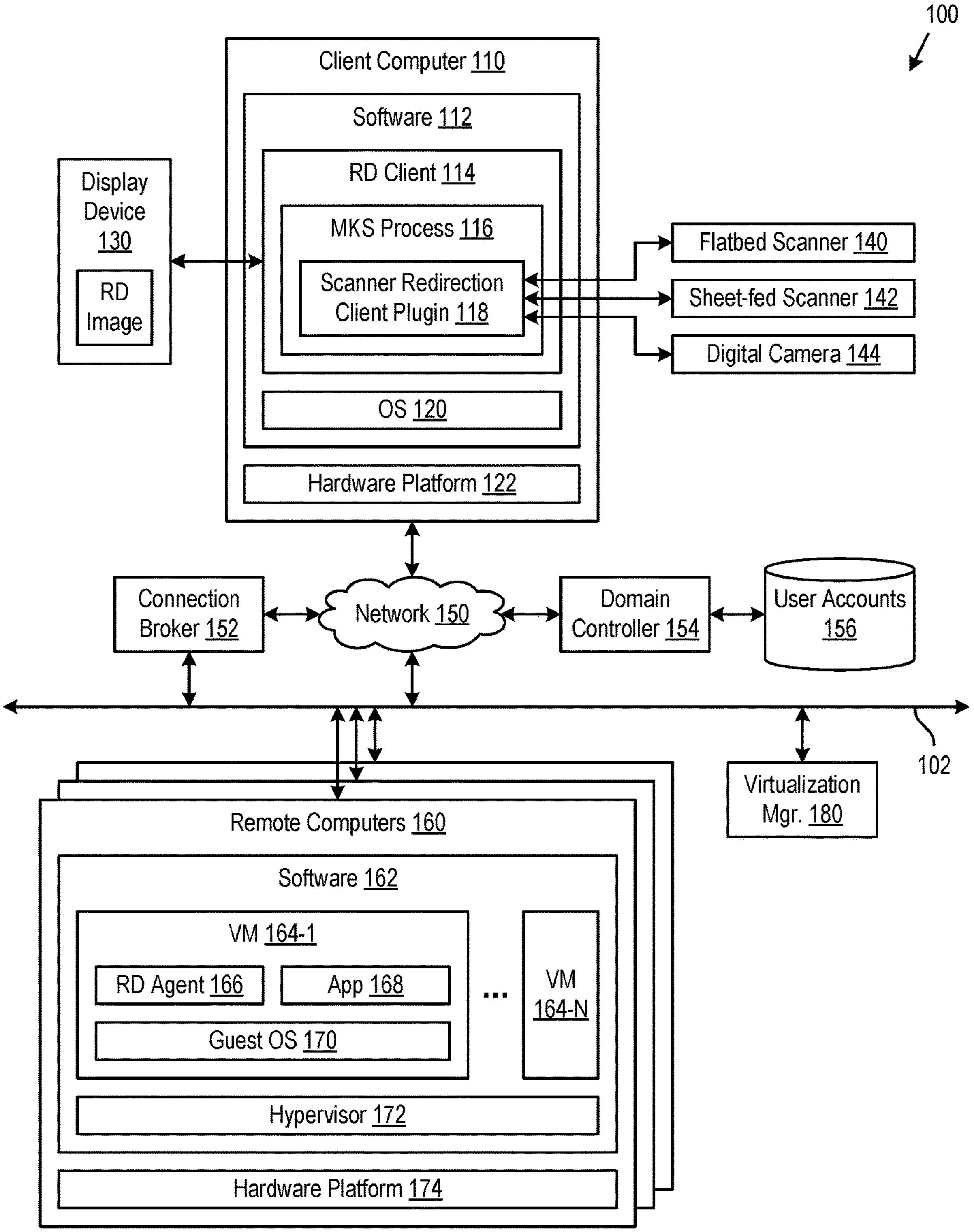
FIG. 1 is a block diagram of an RD computer system in which embodiments may be implemented.

Techniques are described for realizing scanner redirection during an RD session between a client computer and a remote computer. A VM running in the remote computer, also referred to herein as a remote VM, executes an application that consumes images from ICDs. The ICDs are connected to the client computer. To acquire the images, the application of the remote computer requests the images from an application of the client computer, referred to as an RD client application. The RD client application acquires the images from the ICD and transmits them to the application of the remote computer.

According to some embodiments, the client computer and the remote VM each utilize the TWAIN protocol. Pursuant to the TWAIN protocol, the client computer and the remote VM utilize "data source managers" (DSMs) and "data sources" (DSs). For the remote VM, the DSM communicates with a virtual DS, the virtual DS requesting images from the client computer. For the client computer, the DSM communicates with a DS that acquires images from ICDs.

According to other embodiments, the client computer has a different OS than that of the remote VM. As a result, the client computer uses a different scanning protocol such as the Image Capture (ICA) Framework. The remote VM still utilizes a DSM and a virtual DS. However, pursuant to its respective protocol, the client computer utilizes an image capture core that communicates directly with ICDs (not through a separate DS component) to acquire images.

According to techniques described, a user of the application of the remote computer specifies any of the TWAIN protocol transfer modes: native, disk file, or buffered memory. Regardless of the specified transfer mode, on the client computer, the DS or image capture core acquires images from ICDs and provides those images to the RD client application according to a predetermined transfer mode. If the client computer uses the TWAIN protocol, that predetermined transfer mode is the native transfer mode. Otherwise, that predetermined transfer mode is a file-based transfer mode that is specific to the other protocol. These predetermined transfer modes are generally simpler than other available transfer modes for respective scanning protocols, and it is unnecessary for the RD client application to acquire images according to the same transfer mode to be used by the application of the remote computer. The RD client application then transmits the images to the virtual DS of the remote computer to be provided to the application of the remote computer according to the selected transfer mode.

If the native transfer mode is selected, the virtual DS returns the contents of the images to the application of the remote computer. If the disk file transfer mode is selected, the virtual DS stores files to be loaded by the application of the remote computer. If the buffered memory transfer mode is selected, the virtual DS stores portions of the images in memory to be loaded and combined by the application of the remote computer. The application is thus able to acquire images according to any of the supported TWAIN protocol transfer modes regardless of the scanning protocol used by the client computer. These and further aspects of the invention are discussed below with respect to the drawings.

FIG. 1 is a block diagram of an RD computer system 100 in which embodiments may be implemented. RD computer system 100 includes a client computer 110 and a plurality of remote (agent) computers 160 (remote from client computer 110). For example, client computer 110 may be a laptop, a desktop computer, or a server in a private data center controlled by a particular organization. Remote computers 160 may be servers provisioned in a private data center controlled by the particular organization or provisioned in a public data center that includes servers of other organizations.

Client computer 110 is constructed on a hardware platform 122 such as an x86 architecture platform. Hardware platform 122 includes conventional components of a computing device (not shown), such as one or more central processing units (CPUs), memory such as random-access memory (RAM), local storage such as one or more magnetic drives or solid-state drives (SSDs), and one or more network interface cards (NICs). The NIC(s) enable client computer 110 to communicate with remote computers 160 over a network 150 such as the Internet.

Hardware platform 122 supports software 112, which includes an RD client application 114 running on a commodity operating system (OS) 120. For example, RD client 114 may be VMware Horizon® Client, available from VMware, Inc. The term "desktop" in remote desktop (RD) refers to an instance of an interactive environment provided by an OS and software applications, typically in the form of display and sound output and keyboard and mouse input. Through RD client 114, a user accesses an RD from any location. RD client 114 includes a mouse, keyboard, screen (MKS) process 116. One of remote computers 160 transmits an image of the RD to MKS process 116. RD client 114 then communicates with a display device 130 such as a monitor on which the user views the RD image.

When the user performs actions in the RD such as clicking a mouse or typing on a keyboard, the user's actions are received by MKS process 116. MKS process 116 transmits the user's actions to one of remote computers 160 to update the user's RD accordingly. A scanner redirection client plugin 118 of MKS process 116 acquires images from one or more ICDs connected to client computer 110, including a flatbed scanner 140, a sheet-fed scanner 142, and a digital camera 144. Images acquired from the ICDs are transmitted to remote computer 160.

RD computer system 100 includes a domain controller 154 such as Microsoft Active Directory.® Domain controller 154 manages user accounts 156, which include the user's log-in information for the RD session. RD computer system 100 also includes a connection broker 152 that manages connections between client computer 110 and remote computers 160. Connection broker 152 and domain controller 154 may be, e.g., physical servers or VMs running on the same server or on different servers.

In embodiments illustrated herein, RDs are running in VMs 164. VMs 164 are instantiated on remote computers 160, each of remote computers 160 including software 162 and a hardware platform 174. Hardware platform 174 is, e.g., an x86 architecture platform including the conventional components of a computer described above for hardware platform 122. CPU(s) of hardware platform 174 are configured to execute instructions such as executable instructions that perform one or more operations described herein, which may be stored in memory of hardware platform 174.

Software 162 includes a hypervisor 172, which is a virtualization software layer that supports a VM execution space within which VMs 164 are concurrently instantiated and executed. One example of hypervisor 172 is a VMware ESX® hypervisor, available from VMware, Inc. VM 164-1, which is one of VMs 164, includes an RD agent application 166 and an application 168 running on a commodity guest OS 170.

RD agent 166 communicates with RD client 114 to establish the RD session for the user. As part of the RD session, RD agent 166 periodically transmits an updated RD image to RD client 114 to be displayed on display device 130. RD client 114 and RD agent 166 are also referred to individually and collectively herein as RD software. Application 168 consumes images created by the ICDs connected to client computer 110. To do so, application 168 has been modified to handle scanner redirection with RD client 114. For example, application 168 may be Adobe Photoshop,® which the user accesses through the RD session.

Remote computers 160 are managed by a virtualization manager 180. Virtualization manager 180 logically groups remote computers 160 into a cluster to perform cluster-level tasks such as provisioning and managing VMs 164 and migrating VMs 164 from one of remote computers 160 to another. Virtualization manager 180 communicates with remote computers 160 via a management network (not shown), which is provisioned from a network 102 such as a local area network (LAN). Virtualization manager 180 may be, e.g., a physical server or one of VMs 164. One example of virtualization manager 180 is VMware vCenter Server,®) available from VMware, Inc. A particular configuration of RD computer system 100 is illustrated in FIG. 1, but it should be recognized that one or more embodiments may be practiced with other computer system configurations.

Figure 2:
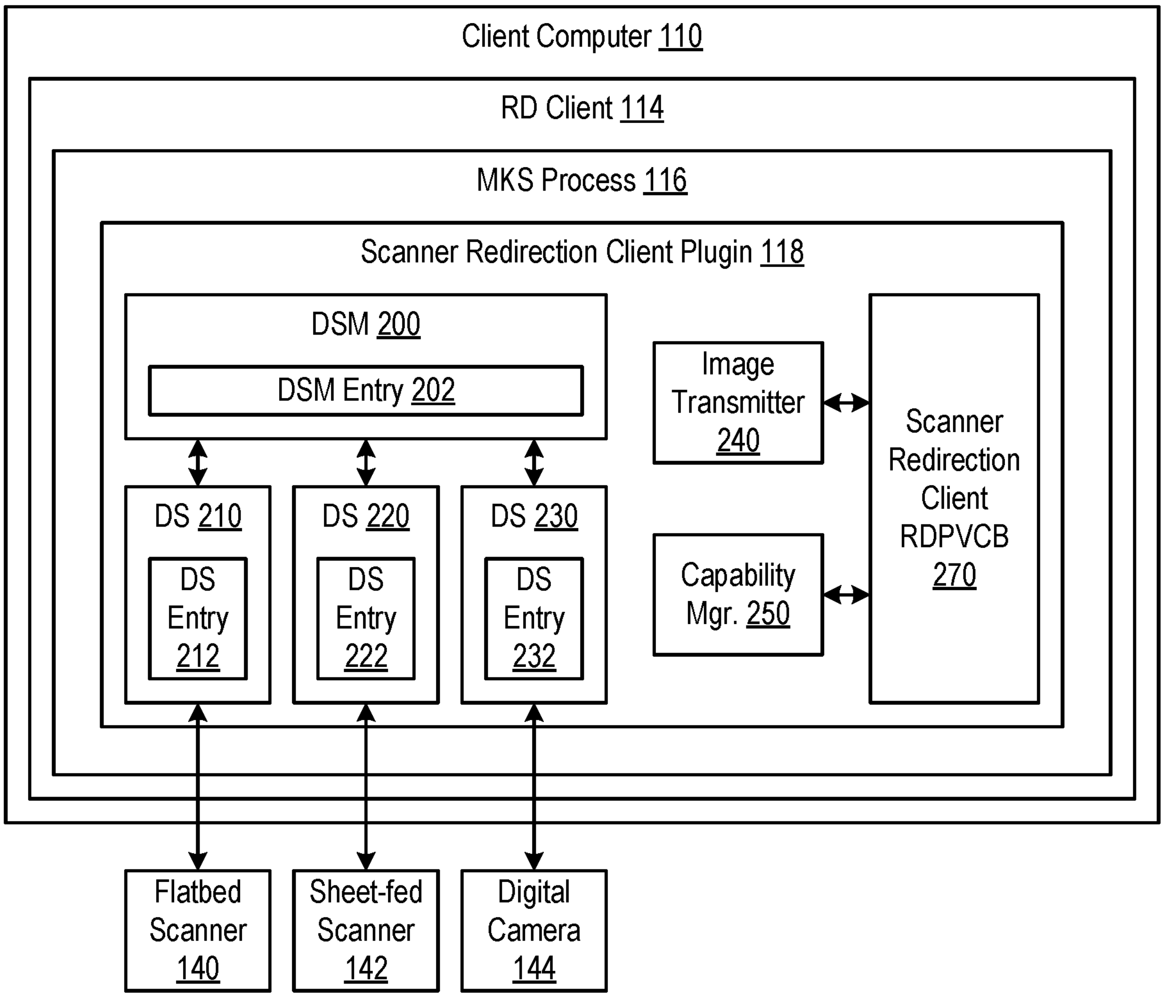
FIG. 2 is a block diagram of a client computer of the RD computer system and ICDs connected to the client computer, according to a first embodiment.

FIG. 2 is a block diagram of client computer 110 and connected ICDs 140, 142, and 144, according to the first embodiment. According to the first embodiment, client computer 110 uses the TWAIN protocol. In the example of FIG. 2, there are three relevant drivers installed for controlling the depicted ICDs: one for controlling flatbed scanner 140, one for controlling sheet-fed scanner 142, and one for controlling digital camera 144. Scanner redirection client plugin 118 includes a scanner redirection client remote desktop protocol virtual channel bridge (RDPVCB) 270, referred to herein as client RDPVCB 270. Client RDPVCB 270 is communication software that is configured to communicate with VM 164-1 via transmission control protocol (TCP) or user datagram protocol (UDP) channels. Such channels are established between client RDPVCB 270 and VM 164-1. Client RDPVCB 270 is also configured to communicate with an image transmitter 240 and a capability manager 250, which are discussed further below.

Scanner redirection client plugin 118 includes a DSM 200, which communicates with DSs 210, 220, and 230 to acquire images from ICDs. To communicate with ICDs, scanner redirection client plugin 118 calls a "client DSM entry" function 202 to provide commands to DSM 200. DSM 200 then calls a "client DS entry" function 212, 222, or 232 to transmit commands to DS 210, 220, or 230, respectively. The relevant DS then returns results to DSM 200 via return values of the client DS entry call. Similarly, DSM 200 returns results to scanner redirection client plugin 118 via client DSM entry 202 return values.

When one of the DSs acquires an image from a corresponding ICD, scanner redirection client plugin 118 instructs image transmitter 240 to transmit the image to VM 164-1 via client RDPVCB 270. Additionally, one of the DSs may acquire capabilities from a corresponding ICD such as different supported resolutions for acquired images. Scanner redirection client plugin 118 instructs capability manager 250 to transmit the capabilities to VM 164-1 via client RDPVCB 270. If the user specifies to adjust settings for a particular ICD, scanner redirection client plugin 118 instructs the corresponding DS via client DSM 200 to control the ICD to adjust those settings.

Figure 3:
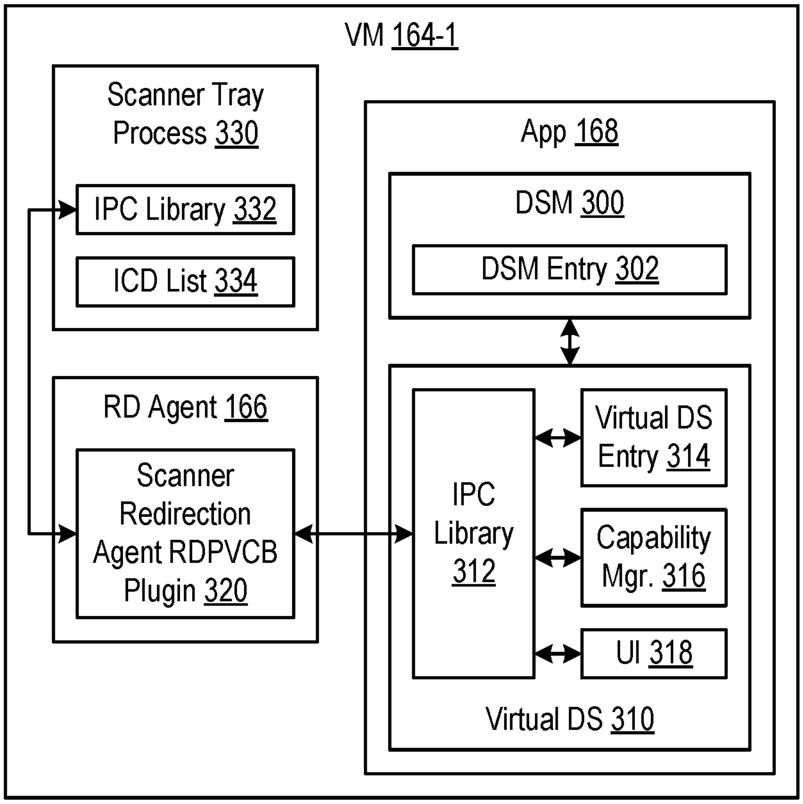
FIG. 3 is a block diagram of a remote VM of the RD computer system, according to embodiments.

FIG. 3 is a block diagram of VM 164-1, according to embodiments. RD agent 166 includes a scanner redirection agent RDPVCB plugin 320, referred to herein as agent RDPVCB plugin 320. Agent RDPVCB plugin 320 is communication software that is configured to communicate with client computer 110 via TCP or UDP channels. Those channels are established between client RDPVCB 270 and agent RDPVCB plugin 320 to facilitate communications between client computer 110 and VM 164-1. Agent RDPVCB plugin 320 is also configured to communicate with a scanner tray process 330 and application 168.

Scanner tray process 330 is used for selecting an ICD connected to client computer 110 for scanner redirection functionalities. Scanner tray process 330 includes an interprocess communication (IPC) library 332, which facilitates communications with agent RDPVCB plugin 320. Scanner tray process 330 also includes an ICD list 334, which is a list of ICDs for which drivers have been installed in client computer 110. For example, to interact with scanner tray process 330, the user may click a toolbar menu item of VM 164-1, which results in scanner tray process 330 showing the contents of ICD list 334. The user may then click on a name of an ICD to select that ICD. Then, future requests from VM 164-1, e.g., to adjust settings of an ICD or to acquire images using the ICD, specify the selected ICD as the target of the request.

Application 168 includes a DSM 300 that communicates with a virtual DS 310. Instead of communicating directly with an ICD, virtual DS 310 communicates with client computer 110, e.g., to request images. Specifically, application 168 calls a "DSM entry" function 302 to transmit commands to DSM 300. DSM 300 then calls a "virtual DS entry" function 314 to transmit commands to virtual DS 310. Virtual DS 310 also returns results to DSM 300 via return values of virtual DS entry 314 calls. Similarly, DSM 300 returns results via DSM entry 302 return values.

In addition to virtual DS entry 314, virtual DS 310 includes an IPC library 312, a capability manager 316, and a user interface (UI) 318. IPC library 312 facilitates communications between agent RDPVCB plugin 320, virtual DS entry 314, capability manager 316, and UI 318. Capability manager 316 caches capabilities of various ICDs such as different resolutions those ICDs can acquire images at, those capabilities being received from capability manager 250 of client computer 110. Capability manager 316 transmits those capabilities to UI 318 to be displayed to the user. Then, via UI 318, the user adjusts various settings such as which resolutions to acquire images at. Capability manager 316 transmits specified adjustments to client computer 110 via agent RDPVCB plugin 320 to be applied to a selected ICD.

Through UI 318, the user also triggers the acquiring of one or more images by the selected ICD. Such requests are transmitted to client computer 110 via agent RDPVCB plugin 320, and then one or more images are received from client computer 110. Specifically, images are received by virtual DS 310 via agent RDPVCB plugin 320. Virtual DS 310 then returns the images to DSM 300 via virtual DS entry 314.

Figure 4:
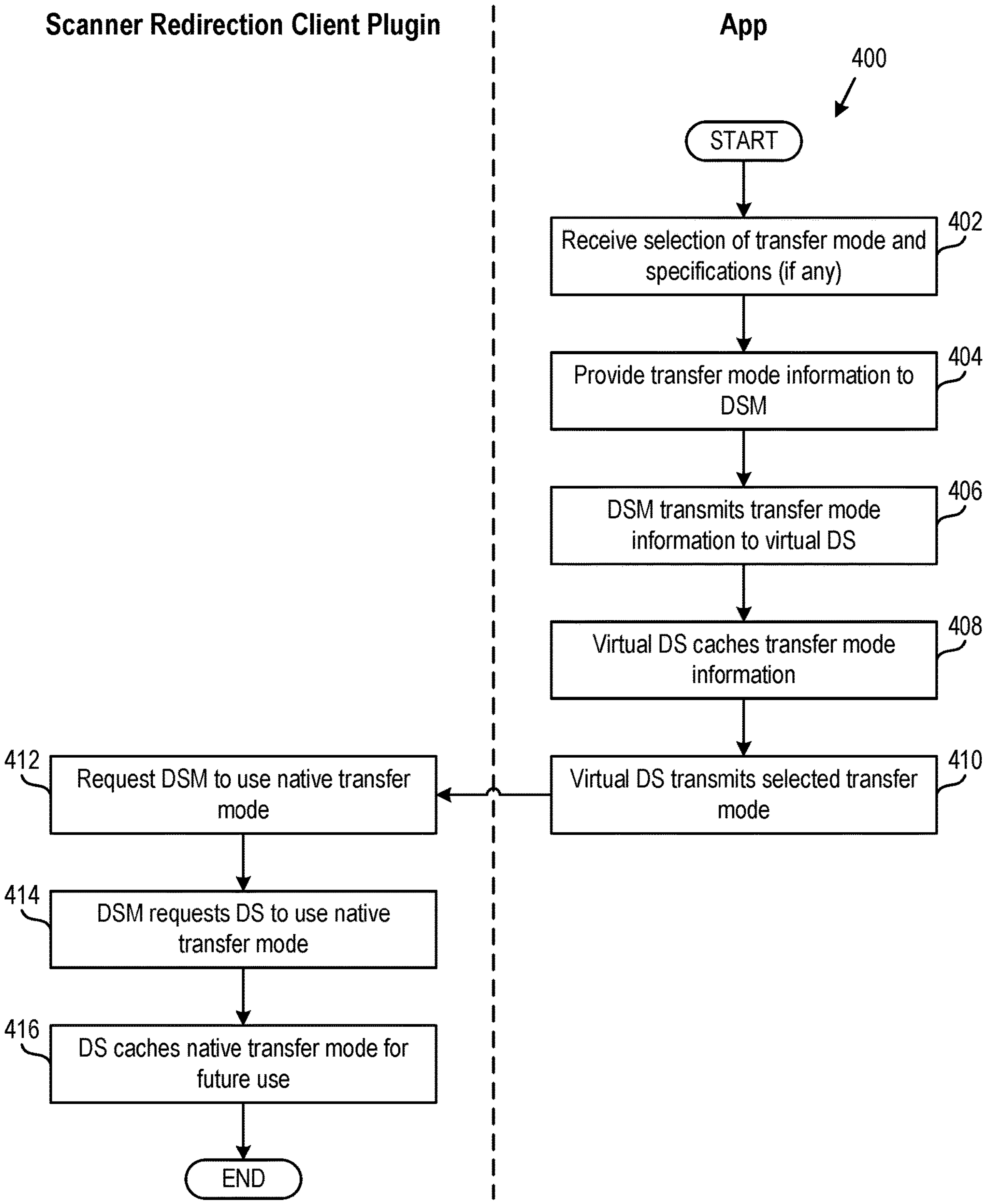
FIG. 4 is a flow diagram of a method performed by the client computer and remote VM to set components of the client computer and remote VM to use respective transfer modes, according to the first embodiment.

FIG. 4 is a flow diagram of a method 400 performed by client computer 110 and VM 164-1 to set components of client computer 110 and VM 164-1 to use respective transfer modes, according to embodiments. At step 402, application 168 receives a selection of a transfer mode and, if the transfer mode is the disk file transfer mode or memory buffer transfer mode, various specifications. For example, the user may open a menu of application 168 where the user selects the transfer mode and enters the specifications. If the selected transfer mode is the disk file transfer mode, the specifications include a file name, a file system path, and a file extension (type). If the selected transfer mode is the buffered memory transfer mode, the specifications include a size of portions for splitting an image into.

At step 404, application 168 provides the transfer mode information (the selected transfer mode and specifications) to DSM 300 by calling DSM entry 302. At step 406, DSM 300 transmits the transfer mode information to virtual DS 310 by calling virtual DS entry 314. At step 408, virtual DS 310 caches the transfer mode information for future reference. At step 410, virtual DS 310 transmits the selected transfer mode to scanner redirection client plugin 118 via a TCP or UDP channel between client RDPVCB 270 and agent RDPVCB plugin 320.

At step 412, scanner redirection client plugin 118 requests DSM 200 to use the native transfer mode by calling DSM entry 202 (regardless of the selected transfer mode for application 168). The message from virtual DS 310 at step 410 thus acts merely as a signal to scanner redirection client plugin 118 to continue the flow of method 400. At step 414, DSM 200 requests a DS, e.g., DS 210, to use the native transfer mode by calling a DS entry function, e.g., DS entry 212. At step 416, the requested DS caches the native transfer mode for future use. After step 416, method 400 ends.

Figure 5:
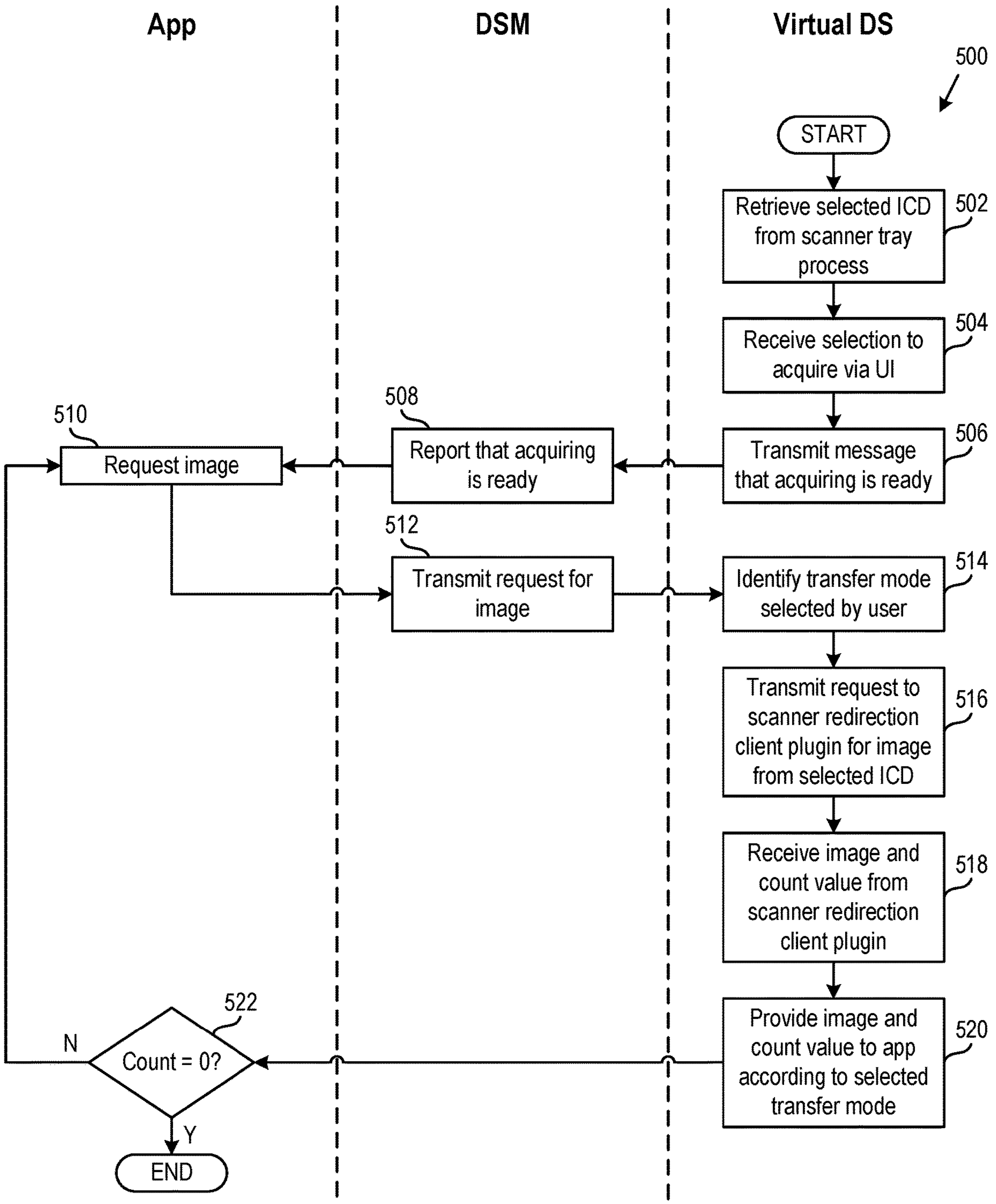
FIG. 5 is a flow diagram of a method performed by the remote VM to acquire one or more images from the client computer, according to embodiments.

FIG. 5 is a flow diagram of a method 500 performed by VM 164-1 to acquire one or more images from client computer 110, according to embodiments. At step 502, virtual DS 310 retrieves a selected ICD from scanner tray process 330. Specifically, scanner tray process 330 locates metadata indicating the name of the selected ICD and transmits the name to virtual DS 310. At step 504, virtual DS 310 receives a selection via UI 318 to acquire an image. For example, the user may click an "acquire" button of UI 318 to trigger the selection. At step 506, virtual DS 310 transmits a message to DSM 300 indicating that acquiring is ready. At step 508, DSM 300 reports to application 168 that acquiring is ready. At step 510, application 168 requests an image from DSM 300 by calling DSM entry 302.

At step 512, DSM 300 transmits a request to virtual DS 310 for the image by calling virtual DS entry 314. At step 514, virtual DS 310 identifies a transfer mode cached thereby, the transfer mode having been previously selected by the user. At step 516, virtual DS 310 transmits a request to scanner redirection client plugin 118 via a TCP or UDP channel between client RDPVCB 270 and agent RDPVCB plugin 320. The request is for an image from the selected ICD, the request including the name of the ICD. Step 516 triggers the method of FIG. 6, as discussed further below.

At step 518, virtual DS 310 receives the image and a "count" value from scanner redirection client plugin 118 via the TCP or UDP channel. Count is a variable indicating whether there are any pending images yet to be acquired from the selected ICD. A count value of zero indicates that there are no pending images. A nonzero value indicates that there is at least one pending image.

At step 520, virtual DS 310 provides the image and count value to application 168 according to the selected transfer mode. Steps 518 and 520 are explained in detail in FIGS. 7-9. At step 522, application 168 checks if the count value is zero. If the count value is nonzero, method 500 returns to step 510, and application 168 requests another image from DSM 300 by calling agent DSM entry 302. Otherwise, if the count value is zero, method 500 ends.

Figure 6:
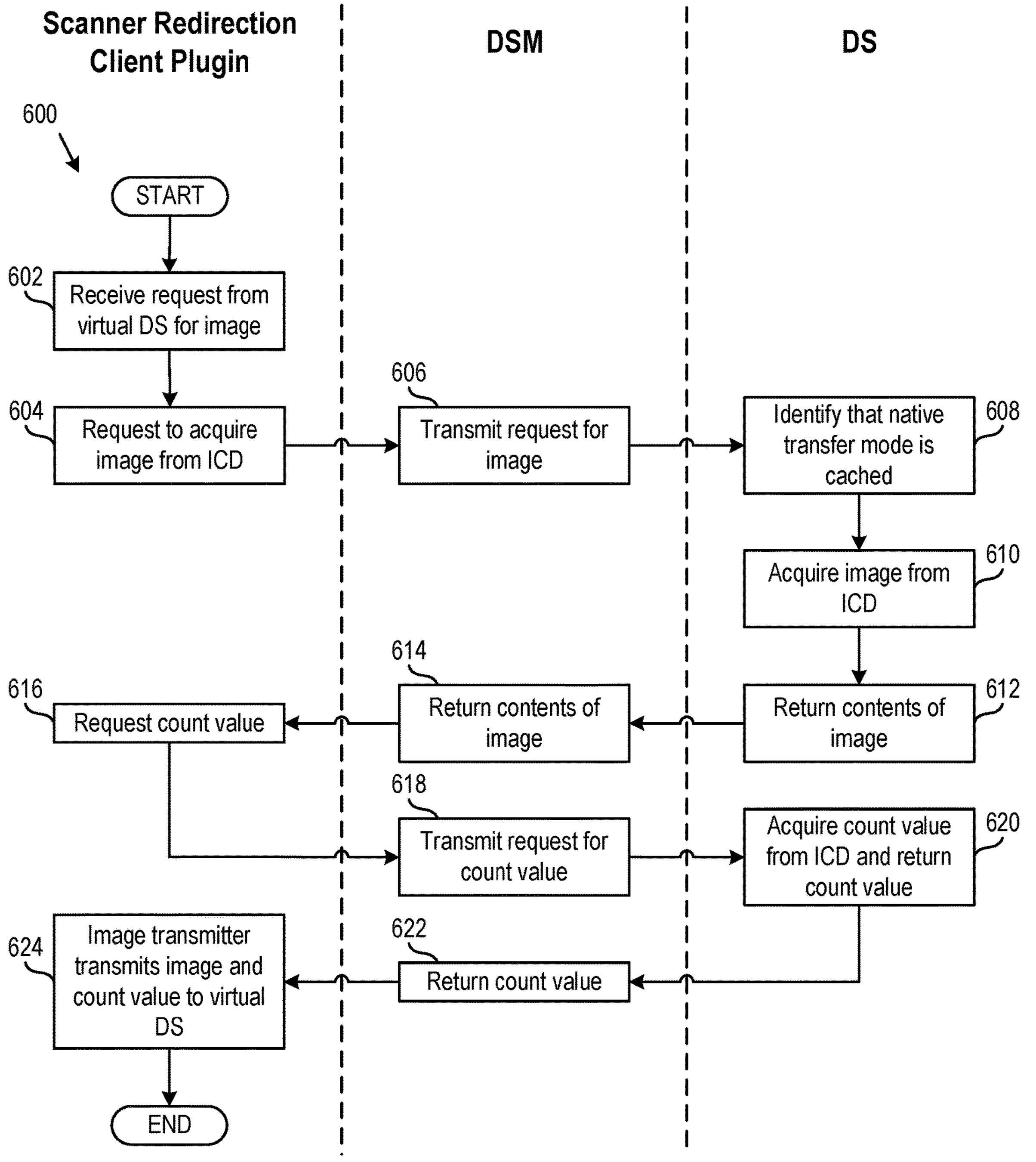
FIG. 6 is a flow diagram of a method performed by the client computer to acquire an image from a selected ICD, according to the first embodiment.

FIG. 6 is a flow diagram of a method 600 performed by client computer 110 to acquire an image from a selected ICD, according to the first embodiment. Method 600 will be discussed with respect to flatbed scanner 140. However, method 600 may be performed for any ICD selected for acquiring an image. At step 602, scanner redirection client plugin 118 receives a request from virtual DS 310 via a TCP or UDP channel between client RDPVCB 270 and agent RDPVCB plugin 320. The request is to acquire an image using flatbed scanner 140, the request including the name of flatbed scanner 140.

At step 604, scanner redirection client plugin 118 requests DSM 200 to acquire an image from flatbed scanner 140 by calling DSM entry 202. At step 606, DSM 200 transmits a request to DS 210 for the image by calling DS entry 212. At step 608, DS 210 identifies that the native transfer mode is cached thereby. At step 610. DS 210 acquires the image from flatbed scanner 140 by communicating with a corresponding driver. At step 612, DS 210 transmits the contents of the image to DSM 200 as a return value of the call to DS entry 212. At step 614, DSM 200 provides the contents of the image to scanner redirection client plugin 118 as a return value of the call to DSM entry 202. At step 616, scanner redirection client plugin 118 requests DSM 200 for a count value by calling DSM entry 202.

At step 618, DSM 200 transmits a request to DS 210 for the count value by calling DS entry 212. At step 620, DS 210 acquires the count value from flatbed scanner 140 and transmits the count value to DSM 200 as a return value of the call to DS entry 212. At step 622, DSM 200 provides the count value to scanner redirection client plugin 118 as a return value of the call to DSM entry 202. At step 624, image transmitter 240 transmits the image and count value to virtual DS 310 via the TCP or UDP channel. After step 624, method 600 ends.

Figure 7:
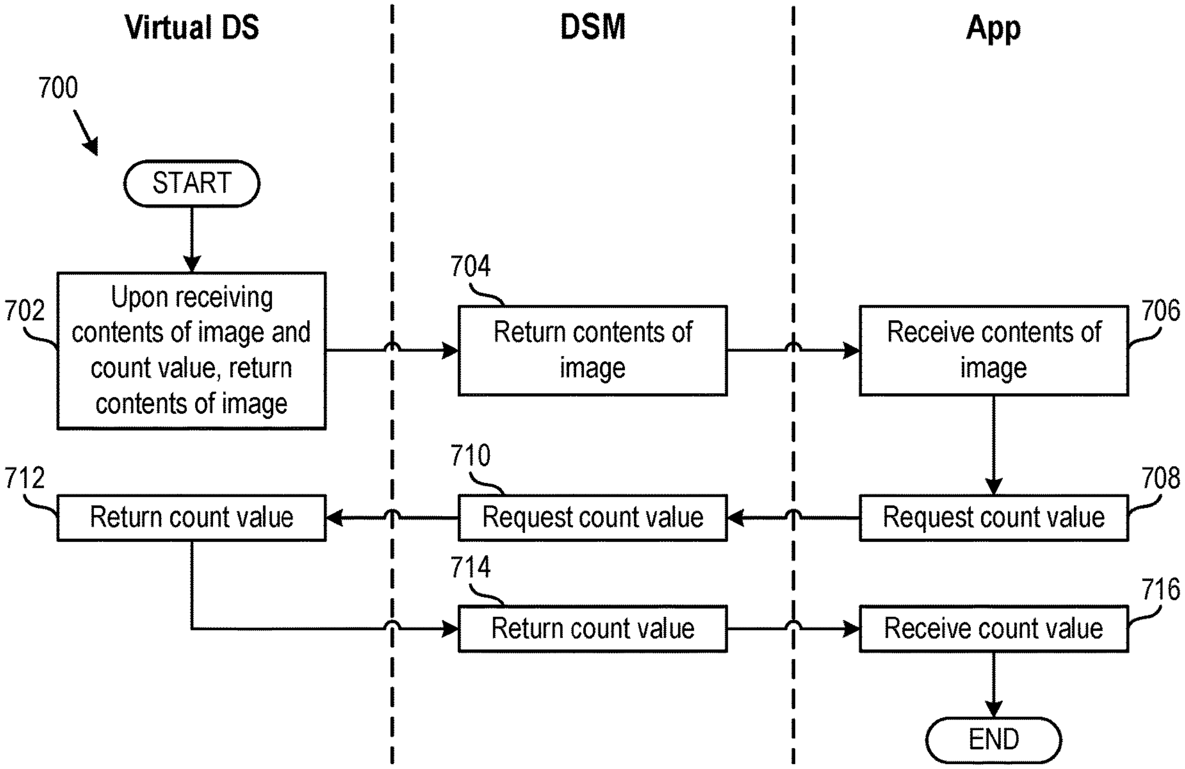
FIG. 7 is a flow diagram of a method performed by the remote VM to provide an image and count value to an application of the remote VM according to the native transfer mode, according to embodiments.

FIG. 7 is a flow diagram of a method 700 performed by VM 164-1 to provide an image and count value to application 168 according to the native transfer mode, according to embodiments. Method 700 is performed upon image transmitter 240 of client computer 110 transmitting the contents of the image and the count value to virtual DS 310 via a TCP or UDP channel between client RDPVCB 270 and agent RDPVCB plugin 320. At step 702, upon receiving the contents of the image and the count value, virtual DS 310 transmits the contents of the image to DSM 300 as a return value of a call to virtual DS entry 314. At step 704, DSM 300 provides the contents of the image to application 168 as a return value of a call to DSM entry 302.

At step 706, application 168 receives the contents of the image from DSM 300. At step 708, application 168 requests DSM 300 for the count value by calling DSM entry 302. At step 710, DSM 300 transmits a request to virtual DS 310 for the count value by calling virtual DS entry 314. At step 712, virtual DS 310 transmits the count value to DSM 300 as a return value of the call to virtual DS entry 314. At step 714, DSM 300 provides the count value to application 168 as a return value of the call to DSM entry 302. At step 716, application 168 receives the count value, and method 700 ends.

Figure 8:
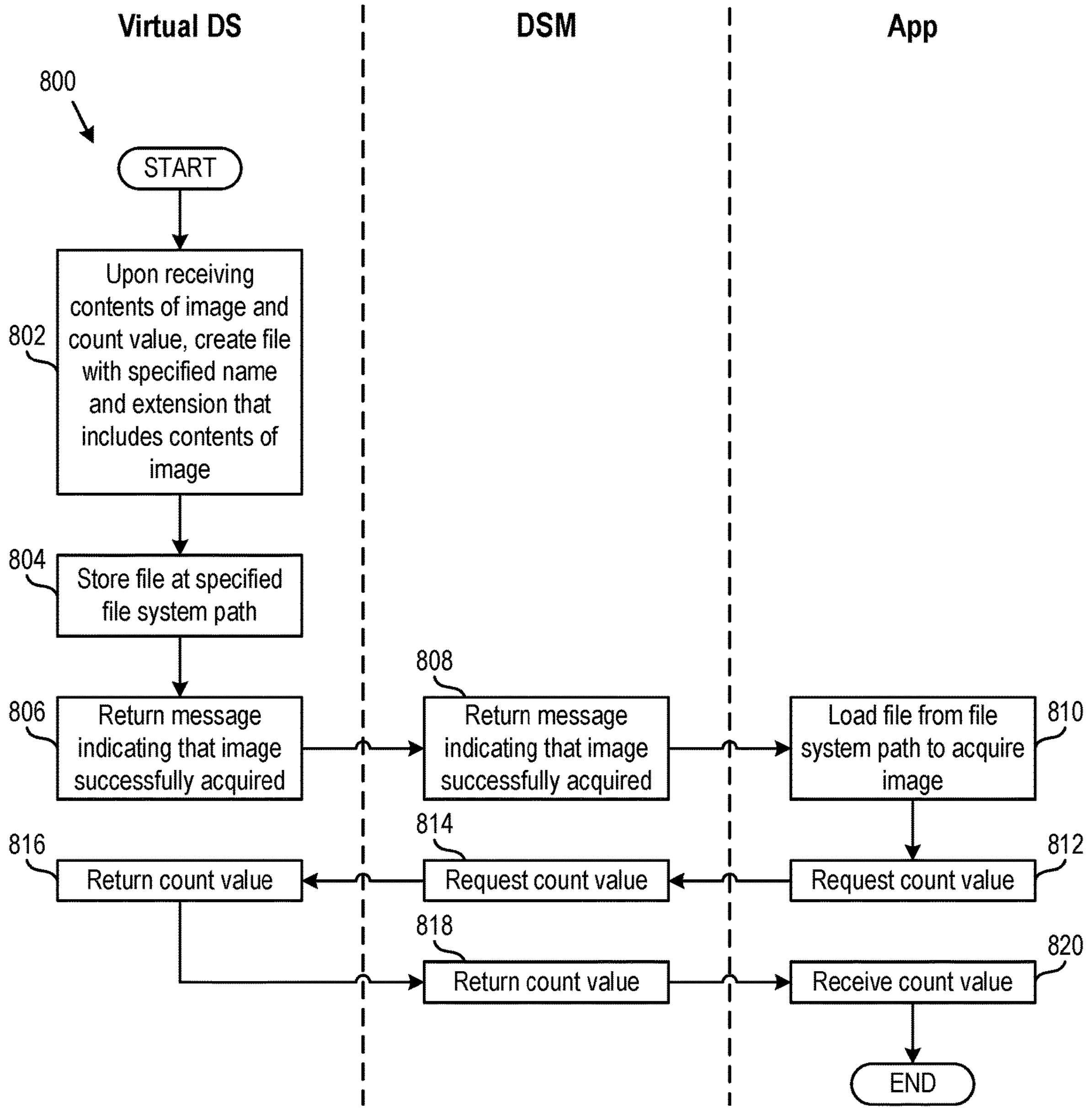
FIG. 8 is a flow diagram of a method performed by the remote VM to provide an image and count value to the application according to the disk file transfer mode, according to embodiments.

FIG. 8 is a flow diagram of a method 800 performed by VM 164-1 to provide an image and count value to application 168 according to the disk file transfer mode, according to embodiments. Method 800 is performed upon image transmitter 240 of client computer 110 transmitting the contents of the image and the count value to virtual DS 310 via a TCP or UDP channel between client RDPVCB 270 and agent RDPVCB plugin 320. At step 802, upon receiving the contents of the image and the count value, virtual DS 310 creates a file with a specified name and extension and that includes the contents of the image. The specified name and extension were previously selected by the user and cached by virtual DS 310.

At step 804, virtual DS 310 stores the file at a specified file system path in storage of hardware platform 174, the file system path having been previously selected by the user and cached by virtual DS 310. At step 806, virtual DS 310 transmits a message to DSM 300 as a return value of a call to virtual DS entry 314. The message indicates that the image was successfully acquired from a selected ICD. At step 808, DSM 300 provides a message to application 168 as a return value of a call to DSM entry 302. The message indicates the successful acquiring of the image.

At step 810, application 168 loads the file from the file system path to acquire the image. At step 812, application 168 requests DSM 300 for the count value by calling DSM entry 302. At step 814, DSM 300 transmits a request to virtual DS 310 for the count value by calling virtual DS entry 314. At step 816, virtual DS 310 transmits the count value to DSM 300 as a return value of the call to virtual DS entry 314. At step 818, DSM 300 provides the count value to application 168 as a return value of the call to DSM entry 302. At step 820, application 168 receives the count value, and method 800 ends.

Figure 9:
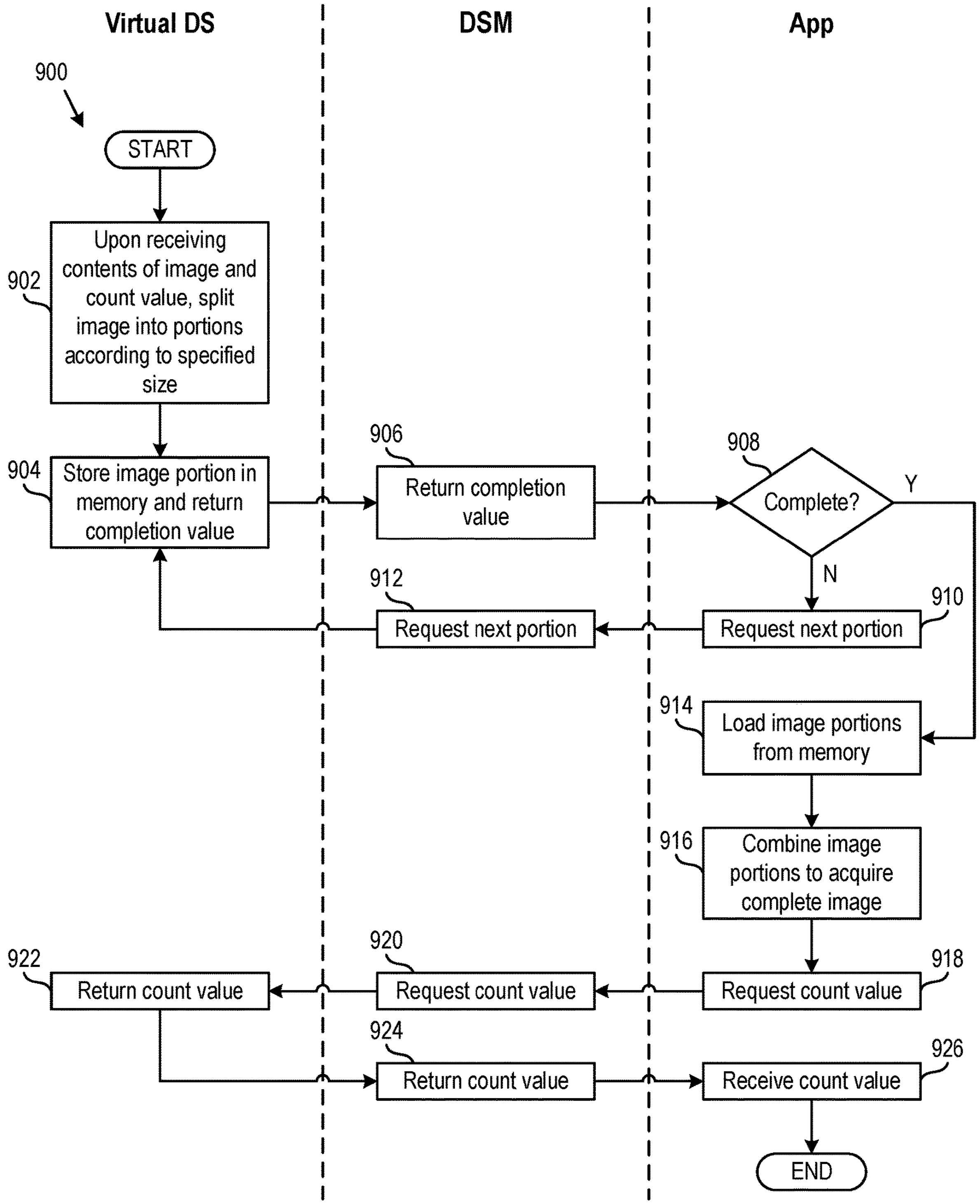
FIG. 9 is a flow diagram of a method performed by the remote VM to provide an image and count value to the application according to the buffered memory transfer mode, according to embodiments.

FIG. 9 is a flow diagram of a method 900 performed by VM 164-1 to provide an image and count value to application 168 according to the buffered memory transfer mode, according to embodiments. Method 900 is performed upon image transmitter 240 of client computer 110 transmitting the contents of the image and the count value to virtual DS 310 via a TCP or UDP channel between client RDPVCB 270 and agent RDPVCB plugin 320. At step 902, upon receiving the contents of the image and the count value, virtual DS 310 splits the image into portions according to a specified size, the size having been selected by the user and cached by virtual DS 310.

At step 904, virtual DS 310 stores a portion of the image in memory of hardware platform 174. Virtual DS 310 also transmits a "completion value" to DSM 300 as a return value of a call to virtual DS entry 314. The completion value indicates whether virtual DS 310 has stored every portion of the image in memory or if more portions remain. In particular, a completion value of zero indicates that there are more portions to be stored, while a nonzero value indicates that no more portions remain.

At step 906, DSM 300 provides the completion value to application 168 as a return value of a call to DSM entry 302. At step 908, if the completion value indicates that virtual DS 310 has not stored the entire image, method 900 moves to step 910. At step 910, application 168 requests the next portion of the image from DSM 300 by calling DSM entry 302. At step 912, DSM 300 requests the next portion of the image from virtual 310 by calling virtual DS entry 314. Method 900 then returns to step 904, and virtual DS 310 stores the next portion of the image in memory of hardware platform 174 and returns a new completion value indicating whether virtual DS 310 has stored every portion of the image. Returning to step 908, if the completion value indicates that virtual DS 310 has stored the entire image, method 900 moves to step 914.

At step 914, application 168 loads all the image portions from memory. Application 168 knows where in memory to load the image portions from because application 168 allocated memory for the image portions and then provided to virtual DS 310, addresses at which to store the image portions. At step 916, application 168 combines the image portions to acquire the complete image. At step 918, application 168 requests DSM 300 for the count value by calling DSM entry 302. At step 920, DSM 300 transmits a request to virtual DS 310 for the count value by calling virtual DS entry 314. At step 922, virtual DS 310 transmits the count value to DSM 300 as a return value of the call to virtual DS entry 314. At step 924, DSM 300 provides the count value to application 168 as a return value of the call to DSM entry 302. At step 926, application 168 receives the count value, and method 900 ends.

Figure 10:
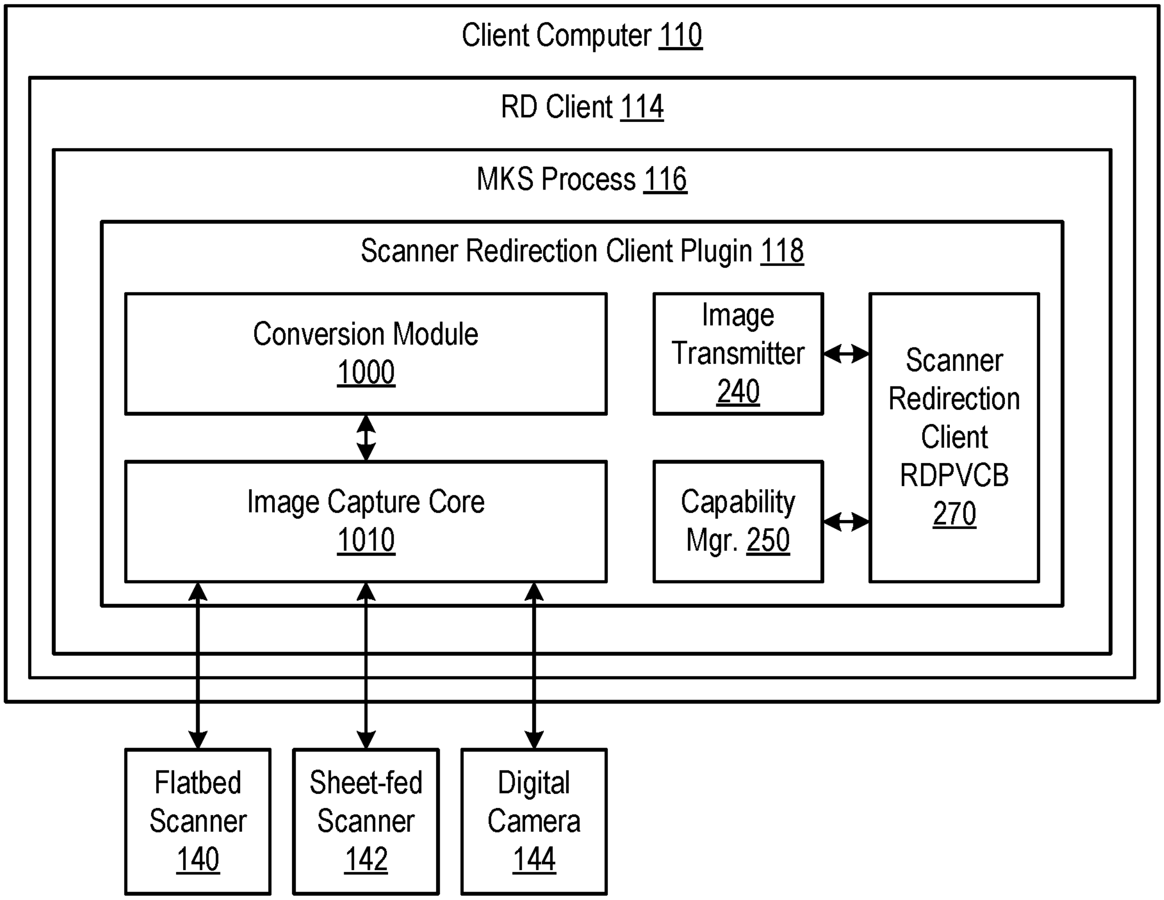
FIG. 10 is a block diagram of the client computer and ICDs connected to the client computer, according to a second embodiment.

FIG. 10 is a block diagram of client computer 110 and connected ICDs 140, 142, and 144, according to the second embodiment. According to the second embodiment, client computer 110 uses a different scanning protocol than the TWAIN protocol, e.g., the ICA framework. Communication between scanner redirection client plugin 118 and individual components thereof and communication between the individual components, are facilitated via API calls. Like the first embodiment, scanner redirection client plugin 118 includes image capturing software that communicates with ICDs to acquire images therefrom. However, according to the second embodiment, the image capturing software is an image capture core 1010 instead of one or more DSs.

When image capture core 1010 acquires an image from an ICD, scanner redirection client plugin 118 instructs image transmitter 240 to transmit the image to VM 164-1 via client RDPVCB 270. Additionally, image capture core 1010 may acquire capabilities from an ICD such as different supported resolutions for acquired images. Scanner redirection client plugin 118 instructs capability manager 250 to transmit the capabilities to VM 164-1 via client RDPVCB 270. If the user specifies to adjust settings for a particular ICD, scanner redirection client plugin 118 instructs image capture core 1010 to control the ICD to adjust those settings.

Because scanner redirection client plugin 118 uses its own scanning protocol, scanner redirection client plugin 118 includes a conversion module 1000. Conversion module 1000 converts data between different scanning protocols. For example, if capability manager 250 receives a request from VM 164-1 to view capabilities of a particular ICD, then once image capture core 1010 acquires those capabilities, conversion module 1000 converts the capabilities to the scanning protocol of VM 164-1. Scanner redirection client plugin 118 then instructs capability manager 250 to transmit them to VM 164-1. If capability manager 250 receives settings from VM 164-1 to apply to the ICD, scanner redirection client plugin 118 instructs conversion module 1000 to convert the selected settings to the scanning protocol of client computer 110 to be understood by image capture core 1010 and applied to the ICD.

Figure 11:
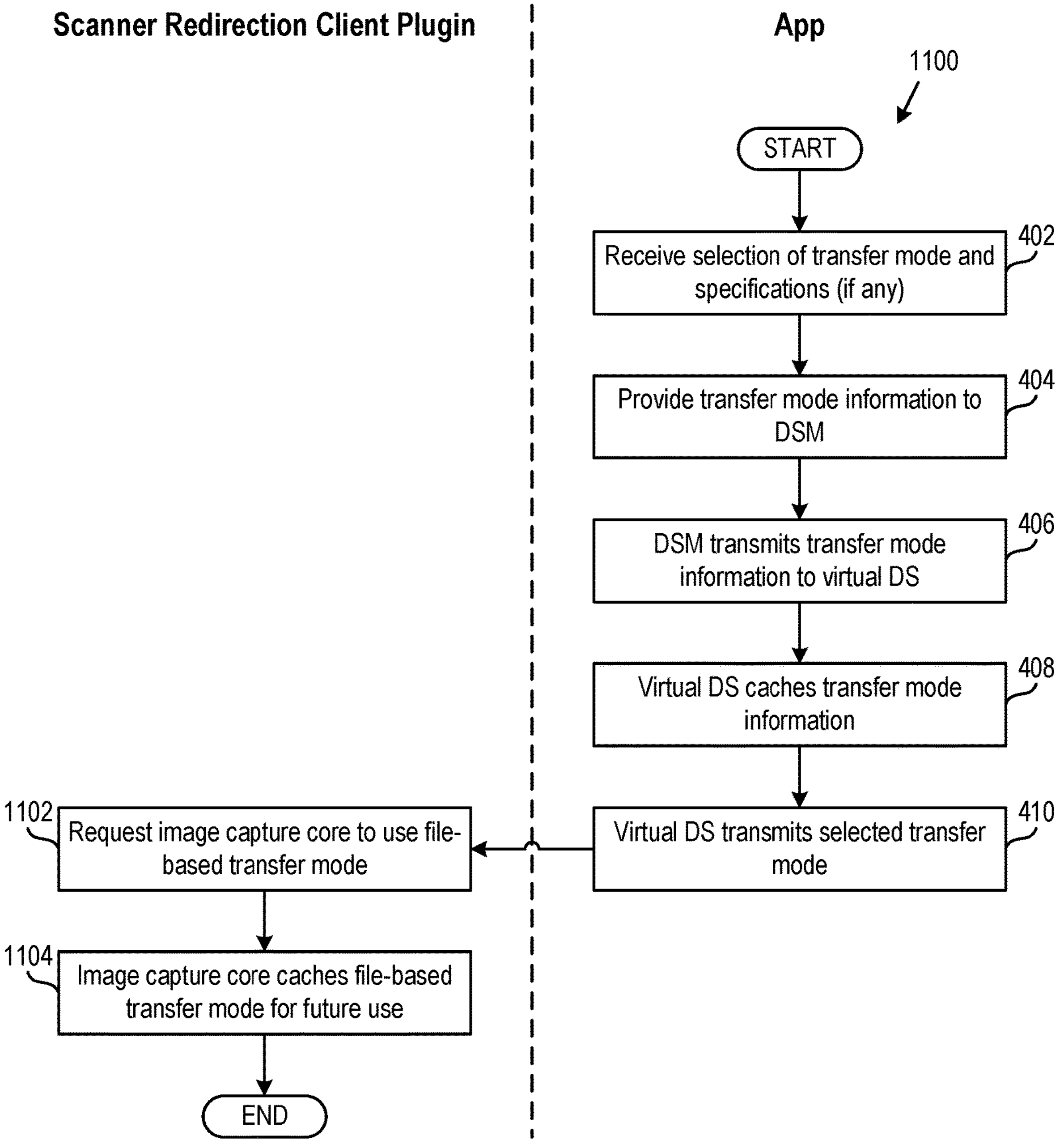
FIG. 11 is a flow diagram of a method performed by the client computer and remote VM to set components of the client computer and remote VM to use respective transfer modes, according to the second embodiment.

FIG. 11 is a flow diagram of a method 1100 performed by client computer 110 and VM 164-1 to set components of client computer 110 and VM 164-1 to use respective transfer modes, according to the second embodiment. Steps of FIG. 11 that are common with FIG. 4 have the same numbers and will not be re-explained. After step 410, when virtual DS 310 transmits a selected transfer mode to scanner redirection client plugin 118, method 1100 moves to step 1102.

At step 1102, scanner redirection client plugin 118 requests image capture core 1010 to use a file-based transfer mode of the scanning protocol of client computer 110 by making an API call to image capture core 1010 (regardless of the selected transfer mode for application 168). The message from virtual DS 310 at step 410 thus acts merely as a signal to scanner redirection client plugin 118 to continue the flow of method 1100. The file-based transfer mode involves an ICD storing an image as a file in storage of hardware platform 122 and scanner redirection client plugin 118 retrieving the file from storage. At step 1104, image capture core 1010 caches the file-based transfer mode for future use. After step 1104, method 1100 ends.

Figure 12:
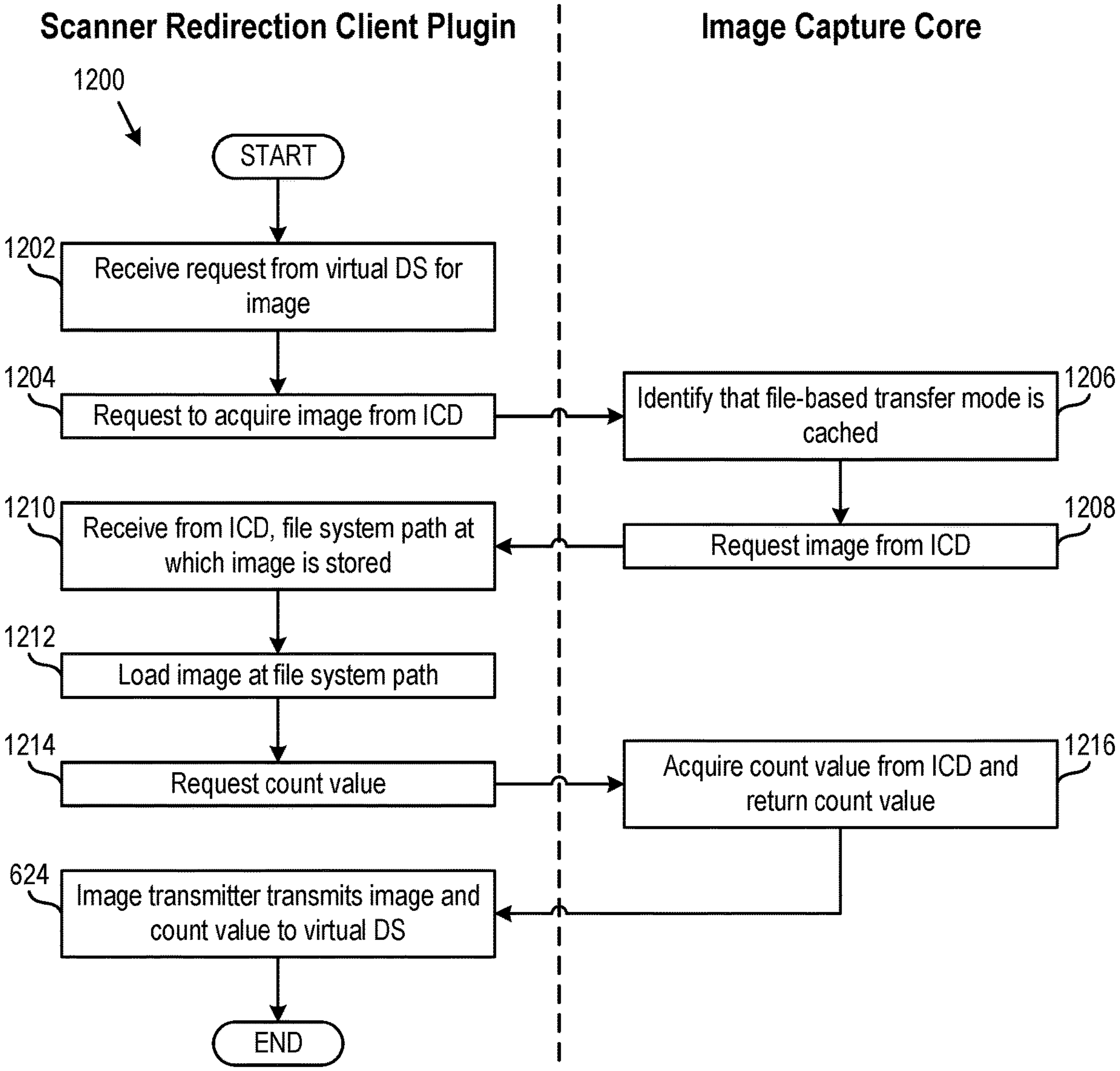
FIG. 12 is a flow diagram of a method performed by the client computer to acquire an image from a selected ICD, according to the second embodiment.

FIG. 12 is a flow diagram of a method 1200 performed by client computer 110 to acquire an image from a selected ICD, according to the second embodiment. Steps of FIG. 12 that are common with FIG. 6 have the same numbers and will not be re-explained. Method 1200 will be discussed with respect to flatbed scanner 140. However, method 1200 may also be used with other ICDs.

At step 1202, scanner redirection client plugin 118 receives a request from virtual DS 310 of VM 164-1 to acquire an image. The request is received over a TCP or UDP channel between client RDPVCB 270 and agent RDPVCB plugin 320. At step 1204, scanner redirection client plugin 118 requests image capture core 1010 to acquire the image from flatbed scanner 140 by making an API call to image capture core 1010. At step 1206, image capture core 1010 identifies that the file-based transfer mode is cached thereby.

At step 1208, image capture core 1010 requests flatbed scanner 140 for the image by communicating with a corresponding driver. Flatbed scanner 140 then creates the image and transmits the image to client computer 110 to be stored at a particular file system path in storage of hardware platform 122. Flatbed scanner 140 then transmits the file system path to scanner redirection client plugin 118. At step 1210, scanner redirection client plugin 118 receives the file system path from flatbed scanner 140.

At step 1212, scanner redirection client plugin 118 loads the image at the file system path. At step 1214, scanner redirection client plugin 118 requests image capture core 1010 for a count value by making another API call to image capture core 1010. At step 1216, image capture core 1010 acquires the count value from flatbed scanner 140 and returns the count value to scanner redirection client plugin 118.

After step 1216, method 1200 continues to step 624 to transmit the image and count value to virtual DS 310. After step 624, method 1200 ends. It should be noted that image capture core 1010 acquires images from flatbed scanner 140 asynchronously. For example, image capture core 1010 may acquire multiple images and return them all before scanner redirection client plugin 118 requests the count value at step 1218.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop computer system, wherein the remote desktop computer system includes a client computer and includes a remote computer on which a remote virtual machine (VM) executes, and wherein the client computer and the remote VM are each configured to execute remote desktop software, the scanner redirection method comprising:

storing, at the remote computer, a setting for a virtual data source executing within the remote VM to use one of a plurality of transfer modes specifying how the virtual data source is to provide images to an application also executing within the remote VM, wherein the one of the plurality of transfer modes is selected by a user of the application;

transmitting a request to the client computer to acquire an image, wherein the client computer acquires the image from an image capturing device connected to the client computer and then transmits the image to the remote VM; and upon receiving the image from the client computer, providing, by the virtual data source to the application, the image using a transmission mechanism of the selected transfer mode.

2. The scanner redirection method of claim 1, wherein the selected transfer mode is a native transfer mode, and wherein providing the image to the application involves providing the contents of the image to the application as a return value of a request by the application for the image.

3. The scanner redirection method of claim 1, wherein the selected transfer mode is a disk file transfer mode, and wherein providing the image to the application involves storing a file in a storage location of the remote computer that is accessible to the application, the stored file including the image.

4. The scanner redirection method of claim 3, further comprising:

receiving specifications that dictate how the application is to acquire the image in the disk file transfer mode, wherein the specifications include a name of the file and a file system path of the storage location of the remote computer.

5. The scanner redirection method of claim 1, wherein the selected transfer mode is a buffered memory transfer mode, and wherein providing the image to the application involves storing a plurality of portions of the image in memory locations of the remote computer that are accessible to the application.

6. The scanner redirection method of claim 5, further comprising:

receiving specifications that dictate how the application is to acquire the image in the buffered memory transfer mode, wherein the specifications include a size for each of the portions of the image.

7. The scanner redirection method of claim 1, wherein the client computer and the remote VM use a common scanning protocol, whereby the client computer uses a data source to acquire the image from the image capturing device.

8. The scanner redirection method of claim 1, wherein providing the image to the application includes:

providing the image by the virtual data source to a data source manager executing within the remote VM; and providing the image by the data source manager to the application.

9. A non-transitory computer-readable medium comprising instructions that are executable in a remote computer of a remote desktop computer system, wherein the instructions when executed cause the remote computer to carry out a scanner redirection method, the remote desktop computer system including a client computer and the remote computer, a remote virtual machine (VM) executing on the remote computer, the client computer and the remote VM each being configured to execute remote desktop software, and the scanner redirection method comprising:

storing, at the remote computer, a setting for a virtual data source executing within the remote VM to use one of a plurality of transfer modes specifying how the virtual data source is to provide images to an application also executing within the remote VM, wherein the one of the plurality of transfer modes is selected by a user of the application;

transmitting a request to the client computer to acquire an image, wherein the client computer acquires the image from an image capturing device connected to the client computer and then transmits the image to the remote VM; and upon receiving the image from the client computer, providing, by the virtual data source to the application, the image using a transmission mechanism of the selected transfer mode.

10. The non-transitory computer-readable medium of claim 9, wherein the selected transfer mode is a native transfer mode, and wherein providing the image to the application involves providing the contents of the image to the application as a return value of a request by the application for the image.

11. The non-transitory computer-readable medium of claim 9, wherein the selected transfer mode is a disk file transfer mode, and wherein providing the image to the application involves storing a file in a storage location of the remote computer that is accessible to the application, the stored file including the image.

12. The non-transitory computer-readable medium of claim 11, wherein the scanner redirection method further comprises:

receiving specifications that dictate how the application is to acquire the image in the disk file transfer mode, wherein the specifications include a name of the file and a file system path of the storage location of the remote computer.

13. The non-transitory computer-readable medium of claim 9, wherein the selected transfer mode is a buffered memory transfer mode, and wherein providing the image to the application involves storing a plurality of portions of the image in memory locations of the remote computer that are accessible to the application.

14. The non-transitory computer-readable medium of claim 13, wherein the scanner redirection method further comprises:

receiving specifications that dictate how the application is to acquire the image in the buffered memory transfer mode, wherein the specifications include a size for each of the portions of the image.

15. The non-transitory computer-readable medium of claim 9, wherein the client computer and the remote VM use a common scanning protocol, whereby the client computer uses a data source to acquire the image from the image capturing device.

16. The non-transitory computer-readable medium of claim 9, wherein providing the image to the application includes:

providing the image by the virtual data source to a data source manager executing within the remote VM; and providing the image by the data source manager to the application.

17. A remote computer of a remote desktop computer system, wherein the remote desktop computer system comprises a client computer and the remote computer, the client computer and the remote computer are each configured to execute remote desktop software, a remote virtual machine (VM) executes on the remote computer, and the remote VM is configured to:

store, at the remote computer, a setting for a virtual data source executing within the remote VM to use one of a plurality of transfer modes specifying how the virtual data source is to provide images to an application also executing within the remote VM, wherein the one of the plurality of transfer modes is selected by a user of the application;

transmit a request to the client computer to acquire an image, wherein the client computer acquires the image from an image capturing device connected to the client computer and then transmits the image to the remote VM; and upon receiving the image from the client computer, provide, by the virtual data source to the application, the image using a transmission mechanism of the selected transfer mode.

18. The remote computer of claim 17, wherein the selected transfer mode is a native transfer mode, and wherein providing the image to the application involves providing the contents of the image to the application as a return value of a request by the application for the image.

19. The remote computer of claim 17, wherein the selected transfer mode is a disk file transfer mode, and wherein providing the image to the application involves storing a file in a storage location of the remote computer that is accessible to the application, the stored file including the image.

20. The remote computer of claim 17, wherein the selected transfer mode is a buffered memory transfer mode, and wherein providing the image to the application involves storing a plurality of portions of the image in memory locations of the remote computer that are accessible to the application.

* * * * *